Aug. 11, 1942.        L. G. TERBRUEGGEN        2,292,587
INDEX
Filed Nov. 18, 1940        3 Sheets-Sheet 1

INVENTOR.
LAWRENCE G. TERBRUEGGEN
BY *Whittemore, Hulbert*
*& Belknap* ATTORNEYS Aug. 11, 1942.    L. G. TERBRUEGGEN    2,292,587
INDEX
Filed Nov. 18, 1940    3 Sheets-Sheet 2

INVENTOR.
LAWRENCE G. TERBRUEGGEN
BY Whittemore, Hulbert
& Belknap ATTORNEYS

Aug. 11, 1942.    L. G. TERBRUEGGEN    2,292,587
INDEX
Filed Nov. 18, 1940    3 Sheets-Sheet 3

INVENTOR.
LAWRENCE G. TERBRUEGGEN
BY Whittemore, Hulbert
 & Belknap
ATTORNEYS

Patented Aug. 11, 1942

2,292,587

UNITED STATES PATENT OFFICE 2,292,587

INDEX

Lawrence G. Terbrueggen, Detroit, Mich., assignor to National Broach & Machine Company, Detroit, Mich., a corporation of Michigan Application November 18, 1940, Serial No. 366,185

4 Claims. (Cl. 90—56)

The present invention relates to indexing mechanism.

Indexing mechanism of the type disclosed in the present application is employed for indexing work pieces, such for example as gears, spline shafts, broaches and the like between succeeding operations, such for example as grinding operations.

The improvements in machining operations of this type in recent years have been very marked, with the result that at the present time it is the primary importance to provide indexing mechanism which will index the work piece with substantially absolute accuracy. Indexing mechanisms of the type at present employed have been satisfactory in the past, but at present a substantial portion of ultimate error in work pieces may be directly traced to inaccuracies in the indexing mechanism itself.

The present mechanism has been designed to avoid inaccuracies inherent in previous constructions and at the same time to provide an indexing mechanism which is simple and economical to construct and easy to operate.

It is accordingly an object of the present invention to provide indexing mechanism characterized by the simplicity of its parts and operation and accuracy of the results obtained thereby.

It is a further object of the invention to provide an indexing mechanism comprising an indexing plate having locking portions engageable by a spring pressed detent, one wall of the locking portions being located radially of the index plate and the opposite wall of the said portions being inclined thereto, and a detent correspondingly formed, that is having one wall parallel to the radial wall of the locking portion of the index plate and the other wall parallel to the inclined wall of the locking portion of the index plate engaged thereby.

It is a further object of the present invention to provide indexing mechanism comprising an index plate having circumferentially spaced peripheral notches in combination with a spring pressed detent mounted in the frame of the indexing mechanism for straight-line sliding movement towards and away from the index plate and radially thereof.

It is a further object of the present invention to provide indexing mechanism including feed means comprising a ratchet disc and a pawl assembly including a lever having a spring pressed elongated pawl at its free end, the parts being constructed and arranged so that the engaging point of the pawl, the pivot connection between the pawl and the lever, and the pivot axis of the lever are all in substantial alignment upon completion of the indexing movement.

It is a further object of the present invention to provide indexing mechanism comprising a manually operable feed means for rotating an index plate in conjunction with stop means for limiting movement of the feeding means between predetermined limits, the stop means comprising a plurality of seats for the reception of the stop in various positions of adjustment, and adjustable abutment elements carried by the stop for fine adjustments.

Other objects of the invention will be apparent as the description proceeds, and when taken in conjunction with the accompanying drawings, wherein.

Figure 1:
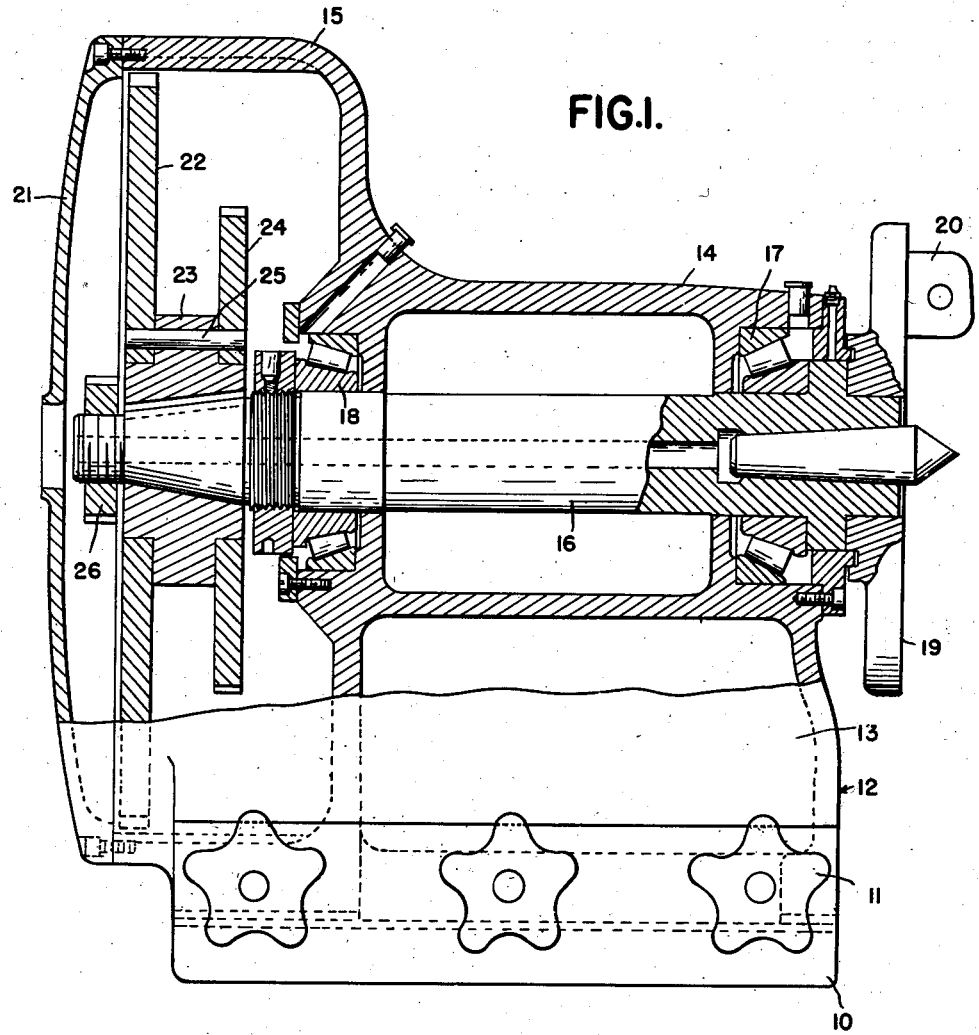
Figure 1 is a side elevation of the indexing mechanism, with parts broken away.

The indexing mechanism forming the subject matter of the present invention is adapted to be mounted on ways on the frame of a grinding machine or similar machine tool, a removable gib 10 having clamping nuts 11 being provided. The indexing mechanism has a main frame or casting 12 including a hollow pedestal 13 carrying a spindle housing portion 14 and an index mechanism housing portion 15. The spindle to be indexed is indicated at 16 and extends completely through the frame 12, being mounted therein for free rotation on roller bearings indicated generally at 17 and 18. A drive plate 19 is rigidly mounted on the spindle 16 for rotation therewith and has a driving projection 20 projecting from the front. Projection 20 carried by the front face of the plate 19 is adapted to engage a work piece for insuring rotation of the work piece upon rotation of the spindle 16.

The indexing mechanism is contained within the housing portion 15 of the frame which is closed by a removable cover plate 21. The indexing mechanism comprises essentially an index plate 22 which is locked in place on a collar 23, keyed or otherwise secured to the shaft 16. The collar 23 also carries a ratchet disc 24 and, as seen in Figure 1, the index plate 22 and the ratchet disc 24 are seated on shoulders of the collar 23 and are secured together by means of a dowel pin 25. The collar 23 is retained on the spindle 16 by means of a nut 26.

Figure 3:
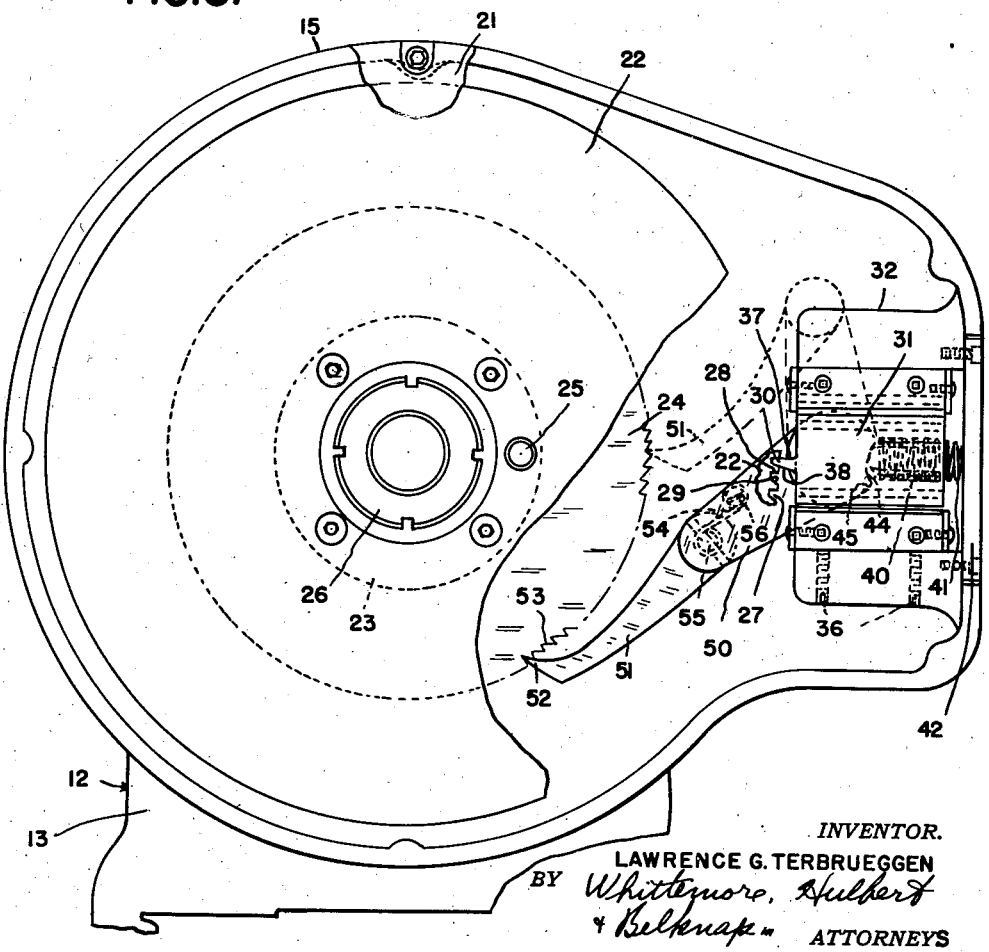
Figure 3 is a rear elevation of the indexing mechanism, with parts broken away.

As best seen in Figure 3, the index plate 22 is provided with a plurality of circumferentially spaced peripheral notches 27, one wall 28 of which is located in a radial plane passing through the axis of the index plate. The opposite wall 29 of the notch 27 is inclined as illustrated.

Figure 6:
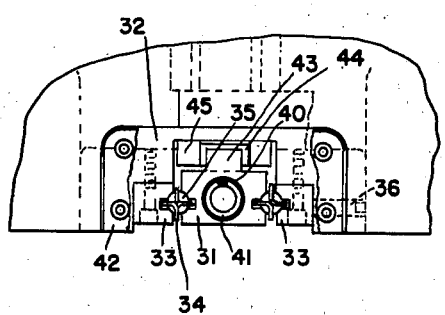
Figure 6 is a fragmentary elevation taken in the direction of the arrows 6—6 of Figure 4, with parts broken away.
Figure 4:
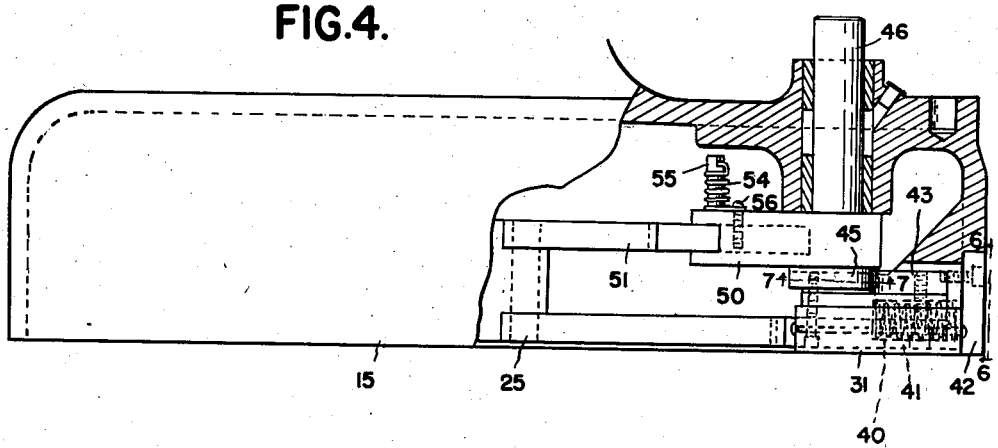
Figure 4 is a top plan view of the indexing mechanism, with parts broken away.

In order to retain the spindle 16 in accurately indexed position, a detent 30 is provided which is engageable in recesses 27. The detent 30, as best seen in Figures 3 and 6, is formed as a projection on a slidably mounted detent slide 31. Secured within the frame portion 12 is a block 32 provided with ways 33. Intermediate the members 33 and slide 31 I provide ball races 34 retaining ball bearings in position. The slide 31 is provided with longitudinally extending grooves in which the balls 35 are seated. Means are provided for cramping one of the members 33 inwardly so as to provide a substantial pressure on the balls 35, and these are illustrated in Figure 3 as comprising clamping bolts 36. As a result of this, the detent slide 31 is mounted for longitudinal movement, while at the same time any possibility of side play or looseness is substantially avoided. Consequently the positioning obtained thereby is extremely accurate.

Referring again to Figure 3, it will be observed that the detent 30 which is received within the notches 27 is correspondingly formed. In other words, one side wall 37 of the detent occupies a radial plane passing through the axis of the index plate. The opposite wall 38 of the detent 30 is inclined at the same angle as the inclined wall 29 of the recess 27. As a result of this construction the radial wall 37 of the detent may be regarded as the positioning wall in conjunction with the wall 28 of the recess. At the same time the inclined walls 29 and 38 serve the purpose of completing indexing rotation of the index plate.

The axis of the ways 33 is also located radially of the axis of the index plate 22, as will be apparent from an inspection of Figure 3.

The detent slide 31 is provided with a spring seat 40 for the reception of a compression spring 41 therein, the spring 41 at its outer end being engaged by a removable plate 42. As a result, the detent slide 31 is continuously urged to the left in Figure 3 or towards a position in which the detent 30 will engage in one of the recesses 27.

Figure 7:
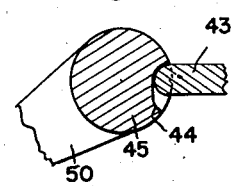
Figure 7 is a fragmentary section on the line 7—7 of Figure 4.

When it is desired to rotate the spindle 16 to a newly indexed position, it is of course necessary in the first place to withdraw the detent 30 from the recess 27 in which it is seated. This is accomplished by a cam 45 formed as a part of or secured to a shaft 46 journaled in the frame of the machine. The detent slide 31 has a projection 43 which is adapted to engage the cam 45, and cam 45 is, in turn, provided with a low portion indicated at 44 in Figure 7 which permits radially inward movement of the slide 31 under the impulse of the spring 41 only when the parts approach the full line position illustrated in Figure 3. The cam 45 is arranged so that upon initial movement the detent slide 31 is moved to the right in Figure 3 a distance sufficient to clear the detent 30 from the recess 27. The cam is so arranged that upon further movement of the cam the detent slide 31 is retained in retracted position and is not permitted to engage the index plate 22 until the indexing movement is substantially complete.

In order to effect movement of the spindle 16 in indexing operation, means are provided which cooperate with the ratchet disc 24, and these are best illustrated in Figure 3. The shaft 46 previously referred to, which also carries cam 45, has extending therefrom the crank or lever 50 to the free end of which is pivoted an elongated pawl 51 terminating in a point 52 which is adpated to have one-way engagement with the teeth 53 of the ratchet wheel 24, as is well understood. The pawl is provided with a biasing coil spring 54 secured to a pin 55 projecting from the lever 51, having one end retained in position by a set screw 56. Pin 55 is keyed or otherwise secured to the pawl 51 and constantly biases the same in a clockwise direction, as seen in Figure 3.

It is important to note that the pawl 51 is substantially elongated, and I prefer that the length of this member shall not be substantially less than the radius of the ratchet disc 24. This is for the reason that in many cases it is desirable to index the spindle 16 a substantial amount, and as indicated in Figure 3, by the dotted line position of the pawl 51, it is possible by this arrangement to index the spindle 16 in 60° steps.

An important feature of the present invention resides in the construction and arrangement of the lever 50 and the pawl 51. It will be observed in Figure 3 that in the full line position, which corresponds to the position of the parts as indexing motion is completed, the point 52, the axis of the pivot connection between the pawl 51 and the lever 50, and the pivot axis of the lever 50 (which is the axis of shaft 46) are in substantial alignment. It will be appreciated that as a result of this construction rotation of the shaft 46 at a constant speed from a position corresponding to the dotted line position of the pawl 51 in Figure 3 to the full line position of pawl 51 in Figure 3 will result in a constantly decreasing rate of rotation of the ratchet disc 24. Furthermore, since at the completion of the indexing movement the three points previously referred to are in substantial alignment, the rate of rotation of the ratchet disc 24 will be at the same time substantially zero. This is important for the reason that during the indexing motion the spindle 16 and all associated parts are mounted for free rotation, and if the indexing movements were carried out at a substantial rate, there would be a tendency for the indexing plate to continue rotation past the desired position.

Figure 5:
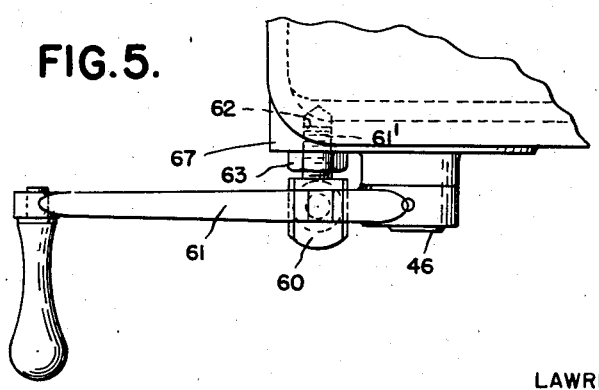
Figure 5 is a fragmentary view of the operating handle and stops.
Figure 2:
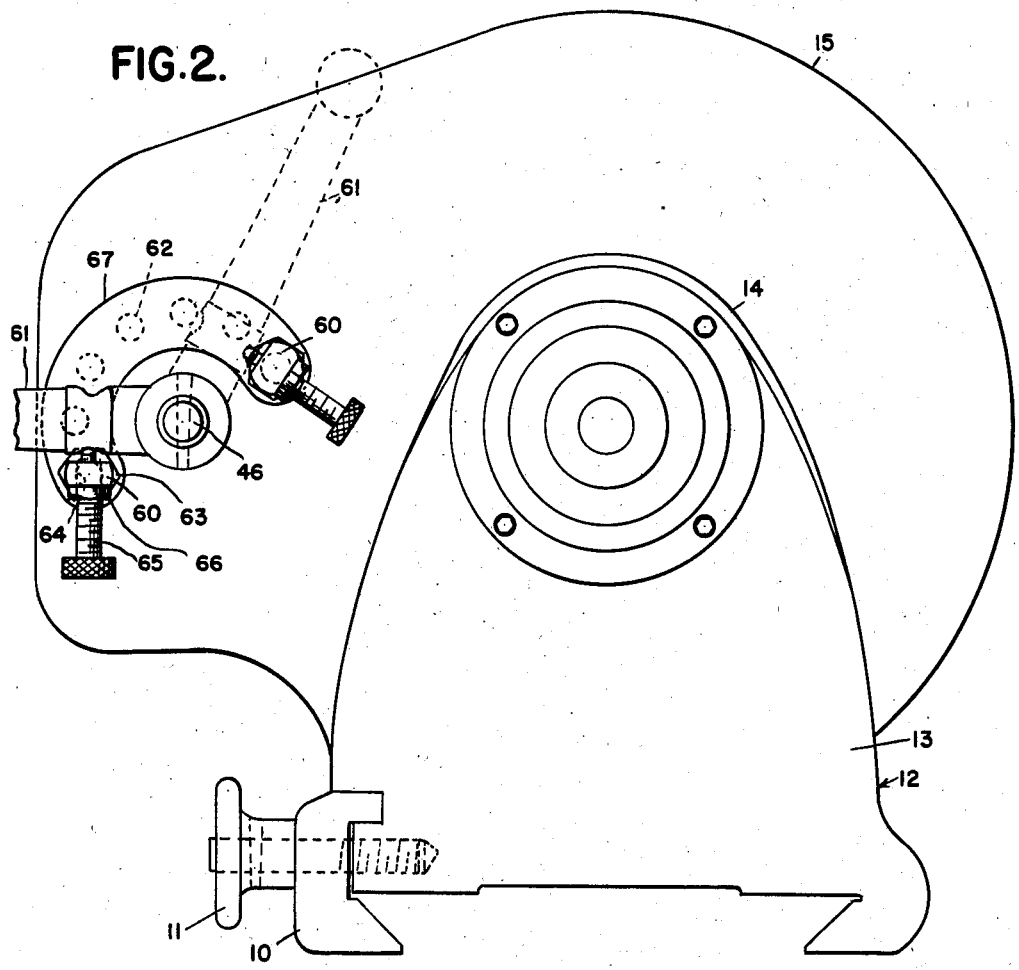
Figure 2 is a front elevation of the indexing mechanism.

In order to relieve the operator from the necessity of strict attention to the arc through which the spindle 16 is rotated, I provide a pair of stops 60 which are adapted to limit rotational movement of the manually operable crank 61, keyed or otherwise secured to the shaft 46. The stops are provided with a threaded projection 61' adapted to be received within correspondingly tapped recesses or seats 62 in the frame of the machine, as best indicated in Figure 5, and are retained in position by means of clamping nuts 63. Each stop 60 is additionally provided with the threaded apertures 64 for the reception of a correspondingly threaded abutment element 65. A locking nut 66 is provided for retaining the abutment element 65 in adjusted position. As best seen in Figure 2, the frame of the machine is provided with a boss 67, and the seats or recesses 62 are provided therein in a series arranged concentrically of the axis of the shaft 46. Accordingly, it is possible to limit movement of the crank 61 between substantially any desired limits. Normally the lowermost stop, as shown in Figure 2, is not moved inasmuch as this stop limits movement of the lever 50 and pawl 51 to a position in which the three points previously referred to are in substantial alignment. However, the other stop may be placed in any of the corresponding recesses or seats and the adjustable abutment 65 thereon may be adjusted so as to provide for accurate control of the amount of movement imparted to the ratchet disc 24 and hence to the index plate 22.

It may be stated that the parts are adjusted so that the index plate 22 is moved during the indexing movement, by means of ratchet mechanism, to a position just short of the desired indexed position. At this time the cam 45 permits inward movement of the detent 30. Since the index plate 22 also stops just short of the indexing movement the first contact between the detent 30 and the walls of the recesses will be between the inclined walls 29 and 38 respectively. This engagement will tend to rotate the index plate 22 in a clockwise direction as seen in Figure 3 until such movement terminates by reason of the engagement between the wall 37 of the detent and the radial wall 28 of the recess. At this time the index plate 22 will be located accurately.

It may be mentioned that by reason of providing radial engaging surfaces for limiting movement of the indexing plate the accuracy of location of the plate in indexed position is substantially increased. It is possible to provide these radial surfaces initially with great accuracy, and during operation of the device any wearing which may take place between the walls of the recesses of the index plate and the detent will take place on the inclined walls which, as previously indicated, do not gauge or limit the final postion of the index plate.

While I have illustrated the locking portions of the index plate as notches 27, it will be appreciated that broadly these might be provided in other forms, such for example as recesses located on a side surface of the index plate, or otherwise.

While I have illustrated but one form of my improved indexing mechanism, it will be understood that the same has been illustrated and described in detail solely to enable those skilled in the art to practice the invention, the scope of which is indicated by the appended claims.

What I claim as my invention is:

1. In indexing mechanism of the type disclosed, a frame, a rotatable index plate having circumferentially spaced peripheral notches, one wall of which is radial and the opposite wall of which is inclined, longitudinal ways provided on the frame with their axes radial of said index plate, a spring pressed detent slidable in said ways radially of said plate, said detent having a nose receivable in said notches, one wall of said nose being radial of said index plate and adapted to locate said index plate accurately by engagement with the radial wall of the notch engaged thereby, the opposite wall of said nose being inclined and adapted to rotate said index plate into indexed position, movable feed means for rotating said index plate, and stop means for limiting movement of said feed means while said index plate is at a point slightly short of indexed position, whereby inward movement of said detent completes indexing movement of said plate.

2. In indexing mechanism of the type disclosed, a frame, a rotatable index plate having circumferentially spaced peripheral notches, one wall of which is radial and the opposite wall of which is inclined, longitudinal ways provided on the frame with their axes radial of said index plate, a spring pressed detent slidable in said ways radially of said plate, said detent having a nose receivable in said notches, one wall of said nose being radial of said index plate and adapted to locate said index plate accurately by engagement with the radial wall of the notch engaged thereby, the opposite wall of said nose being inclined and adapted to rotate said index plate into indexed position, movable feed means for rotating said index plate, said feed means comprising a ratchet disc, a lever adjacent said disc, and an elongated pawl pivoted to the free end of said lever and having its point spring pressed to engagement with said disc, and stop means for limiting movement of said feed means while said index plate is at a point slightly short of indexed position, whereby inward movement of said detent completes indexing movement of said plate, said lever and pawl being constructed and arranged such that the point of said pawl, the pivot connection between said pawl and said lever, and the axis of said lever are substantially aligned upon engagement with said stop.

3. In indexing mechanism of the type disclosed, a rotatable index plate, a ratchet disc secured thereto, feed mechanism for advancing said ratchet disc and index plate step by step comprising a lever pivotally mounted adjacent the periphery of said disc, a spring-pressed pawl having its point engageable with said ratchet disc, said pawl being pivotally secured adjacent a free end of said lever, a stop for limiting movement of said lever in feeding direction, said pawl and lever being constructed and arranged whereby the point of said pawl, the pivot connection between said pawl and said lever, and the pivot axis of said lever are substantially aligned upon engagement with said stop.

4. In indexing mechanism of the type disclosed, a rotatable index plate, a ratchet disc secured thereto, feed mechanism for advancing said ratchet disc and index plate step by step comprising a lever pivotally mounted adjacent the periphery of said disc, a spring-pressed pawl having its point engageable with said ratchet disc, the length of said pawl being not substantially less than the radius of said disc, said pawl being pivotally secured adjacent a free end of said lever, a stop for limiting movement of said lever in feeding direction, said pawl and lever being constructed and arranged whereby the point of said pawl, the pivot connection between said pawl and said lever, and the pivot axis of said lever are substantially aligned upon engagement with said stop.

LAWRENCE G. TERBRUEGGEN.